Aug. 16, 1932.　　A. ELSENHANS　　1,871,448
TOOL FOR DRESSING THE GRINDSTONES IN WOOD GRINDERS
Filed Dec. 17, 1930

Inventor
Albert Elsenhans

Patented Aug. 16, 1932

1,871,448

UNITED STATES PATENT OFFICE

ALBERT ELSENHANS, OF ESSEN, GERMANY

TOOL FOR DRESSING THE GRINDSTONES IN WOOD GRINDERS

Application filed December 17, 1930, Serial No. 503,007, and in Germany December 31, 1929.

The invention relates to dressing tools for the grindstones of wood grinders, and has for its object to simplify their production and keep their dressing edges in a greater and permanently equal sharpness. To attain this purpose according to the invention, the dressing elements formed from thin plates are arranged on helical lines steeply and uniformly inclined towards the generating line of the circumferential surface of the dressing-roller, so that in a grindstone dressed by a tool according to the invention cutting edges of always equal grinding capacity are produced having the form of helical lines.

It has been proposed already to employ tools composed of flat or unflat disks of sheet-metal in other treating methods of grindstones, and particularly for restoring grindstones that have become unserviceable. However, these tools are unsuited to the purpose in view, since they cannot produce uniformly inclined cutting edges on the grindstone which, on the contrary, by their action becomes uniformly smooth or grained on its surface.

Figure 1:
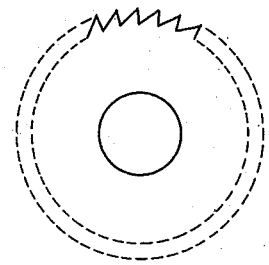
Figure 2:
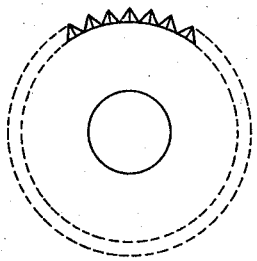
Figure 3:
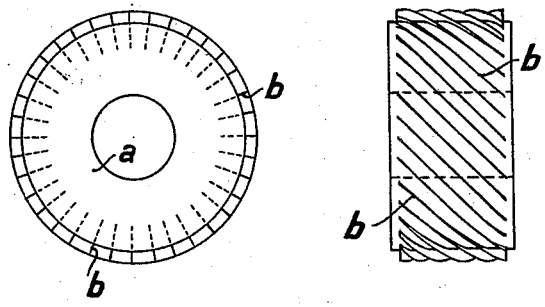

In the accompanying drawing Figures 1 and 2 illustrate known types of tools for dressing the grindstones in wood grinders, and Fig. 3 shows two different views of one embodiment of the invention.

Referring to the drawing, in the known tool shown in Fig. 1 grooves are worked into the surface so as to impart an appearance resembling a circular saw to the cross section of the dressing-roller. In the second type of known dressing-roller (Fig. 2) the dressing elements are formed by pyramidal or coniform points. Both types possess their greatest dressing capacity when used for the first time and become dull already after short use so that, with progressing wear, the dressing capacity of the tool is reduced in increasing measure.

According to the invention, the dressing tool consists of a roller-like carrier $a$ (Fig. 3) to the circumferential portion of which the dressing elements are secured in the form of thin plates $b$. The dressing edges are disposed on a cylindrical circumferential surface, and the plates extend like a thread, so that the dressing edges of the plates have the form of helical lines. During the natural wear of the tool both the keenness of the dressing edges and their helical form are retained, and the tool remains therefore fully efficient until the plates have been worn down to the circumferential surface of the carrier $a$. The plates, which are made of tough and hard material, may be fastened to the carrier in various ways, a particularly suitable method consisting in casting them into the carrier.

What I claim is:—

In a tool for dressing grindstones in wood grinders the combination of a central hub, consisting of mouldable material, and sheets of flexible thin spring steel embedded therein the flats of which conform to high pitched helicoidal surfaces and the outer edges being disposed on a cylindrical periphery so as to form invariably sharp cutting edges extending in helical lines, and being cast in place with their inner parts after being arranged in due twisted position.

In testimony whereof I affix my signature.

ALBERT ELSENHANS.